(No Model.)
W. C. KROEGHER.
DIE FOR WELDING LINKS.
No. 377,395. Patented Feb. 7, 1888.
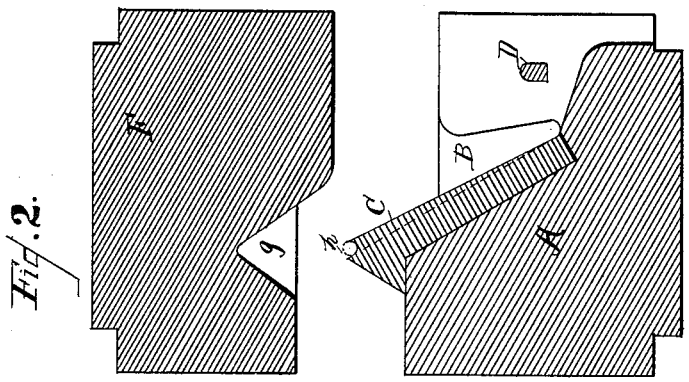
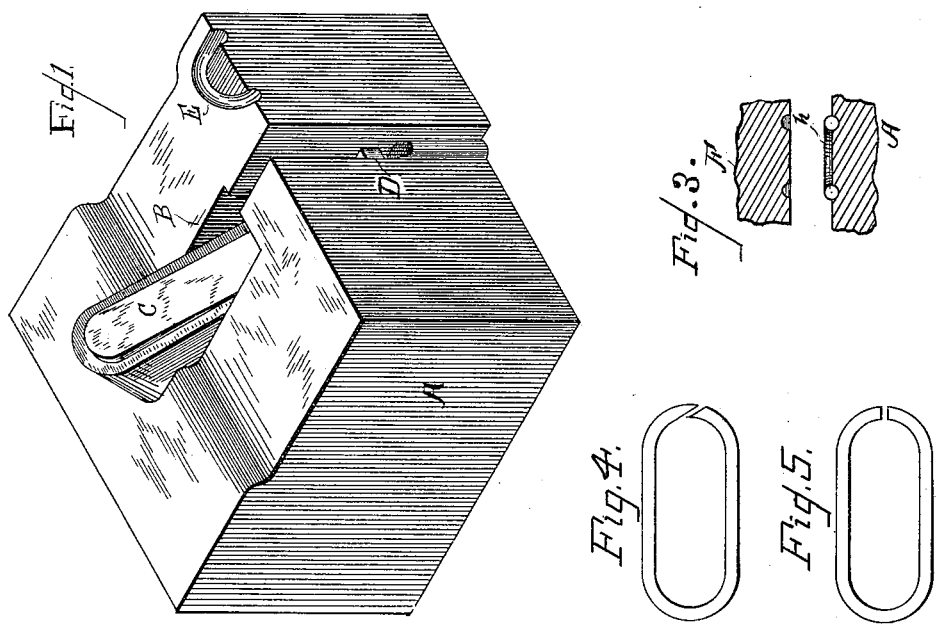
Witnesses:
Geo. H. Harvey
C. F. Johnston.
Inventor.
William C. Kroegher
By A. C. Johnston.
his attorney.

UNITED STATES PATENT OFFICE.

WILLIAM C. KROEGHER, OF ALLEGHENY, PENNSYLVANIA.

DIE FOR WELDING LINKS.

SPECIFICATION forming part of Letters Patent No. 377,395, dated February 7, 1888.

Application filed October 21, 1887. Serial No. 253,037. (No model.)

*To all whom it may concern:*

Be it known that I, WILLIAM C. KROEGHER, of Allegheny, in the county of Allegheny and State of Pennsylvania, have invented a new and useful Improvement in Dies for Welding Links; and I do hereby declare the following to be a full, clear, and exact description thereof.

My invention relates to an improvement in dies for welding links; and it consists of an anvil, hammer, and detachable die constructed, arranged, and operating with relation to each other, as hereinafter described.

To enable others skilled in the art with which my invention is most nearly connected to make and use it, I will proceed to describe its construction and operation.

In the accompanying drawings, which form part of my specification, Figure 1 is a perspective view of the anvil-die with detachable die secured therein. Fig. 2 is a transverse section of the hammer-die, anvil-die, and detachable die. Fig. 3 is a cross-section of the hammer and anvil, showing the cavity E. Figs. 4 and 5 represent the link formed and ready for the welding process, Fig. 4 showing the "lap" form of weld, and Fig. 5 the "butt" form of weld.

In the drawings, A is the anvil, recessed, as at B, for the reception of the die C, and is provided with a cavity, E, which, in connection with the action of the hammer, also provided with a corresponding cavity, as shown in Fig. 3, is for the purpose of working in the "fin" formed in the operation of welding the link. In the cavity B is a support, D, for the tongs used for manipulating the link. The hammer F is provided with a recess, $g$, corresponding to the upper end of the detachable die C, so as to form in connection with it a welding-matrix. The anvil and hammer are connected with suitable operating mechanism analogous to a steam-hammer, which will readily be understood by the skillful mechanic.

The links are formed by any suitable means, and at the point to be welded are heated to the welding heat and placed on the detachable die C, as shown in dotted lines in Fig. 2, and a single stroke of the hammer F will form a complete weld. The link is then turned over and a second stroke brought to bear upon it, thereby completing the weld, with its necessary finish, except the working in of the fin, which is accomplished by placing the welded end of the link in the cavity E of the anvil, and a downward stroke of the hammer on the link will work in the fin.

Having thus described my improvement, what I claim is—

1. The anvil A, having a cavity, B, and the inclined detachable die C, in combination with the hammer F, having cavity $g$, substantially as herein described, and for the purpose set forth.

2. The anvil A, having cavities B and E, in combination with the detachable die C and hammer F, having cavities $g$ $h$, arranged and operating as herein described, and for the purpose set forth.

In testimony whereof I have hereunto set my hand this 1st day of April, A. D. 1887.

WM. C. KROEGHER.

Witnesses:
A. C. JOHNSTON,
GEO. H. HARVEY.